United States Patent [19]

Katchko et al.

[11] Patent Number: 4,654,270
[45] Date of Patent: Mar. 31, 1987

[54] HEAT CURABLE POLYSILOXANE RELEASE COATINGS WHICH STRATIFY WHEN BAKED AND PAPER COATED THEREWITH

[76] Inventors: John Katchko; Thomas H. Plaisance; Karel Kriz, all c/o DeSoto, Inc., 1700 S. Mt. Prospect Rd., Des Plaines, Ill. 60018

[21] Appl. No.: 876,985

[22] Filed: Jun. 20, 1986

Related U.S. Application Data

[62] Division of Ser. No. 710,336, Mar. 11, 1985, Pat. No. 4,618,657.

[51] Int. Cl.[4] ................................................. B32B 9/04
[52] U.S. Cl. .................................... 428/447; 428/448; 428/449; 428/451; 428/452; 428/480
[58] Field of Search .............................. 428/447–449, 428/451, 480, 452

[56] References Cited

U.S. PATENT DOCUMENTS 2,588,367  3/1960  Dennett ................................ 106/170
3,900,617  8/1975  Grenoble ........................... 427/389.9

Primary Examiner—Edith Buffalow

[57] ABSTRACT

A heat curable coating composition which deposits a release coating containing a smaller proportion of silicone release material is disclosed. This composition comprises (1) an hydroxy-functional resin which is preferably a polyester resin; (2) a cross-linking agent for the polyester, such as an aminoplast resin; and (3) at least one and preferably a mixture of at least two reactive silicones which are preferably polysiloxanes. These two polysiloxanes comprise: (A) a hydrogen- or alkoxy-functional polysiloxane; and (B) an elastomeric polysiloxane reactive with the hydrogen- or alkoxy-functional polysiloxane to provide release properties. Either or both of the polysiloxanes are reactive with the hydroxy-functional resin or the cross-linking agent. Components (1), (2) and (3) are compatible in a liquid admixture which may contain a volatile inert organic solvent or which may be solvent-free. During the heat cure, the polysiloxanes in component (3) become incompatible with respect to the balance of the composition, and this causes stratification of the polysiloxanes to the surface of the cured coating when the composition is deposited upon a paper or plastic substrate and heated to cure the same. The hydroxy-functional resin and its cross-linking agent go to the paper surface and fill its porosities to minimize the amount of polysiloxane needed to provide the desired release properties.

6 Claims, No Drawings

HEAT CURABLE POLYSILOXANE RELEASE COATINGS WHICH STRATIFY WHEN BAKED AND PAPER COATED THEREWITH

This is a division of application Ser. No. 710,336, filed Mar. 11, 1985, now U.S. Pat. No. 4,618,657.

DESCRIPTION

1. Technical Field

This invention relates to polysiloxane release coatings and includes compositions for coating paper and other substrates in order to provide a release surface thereon.

2. Background Art

Reactive organic polysiloxane compositions are known for coating paper in order to provide a release surface thereon. These polysiloxane compositions are expensive, and it is desired to extend the usefulness of these materials by providing extended coating compositions which will allow a smaller amount of polysiloxane to effectively coat a given surface area, and to coat substrates which previously resisted coating.

DISCLOSURE OF INVENTION

In accordance with this invention, a heat curable coating composition is provided which is adapted to deposit a release coating which stratifies to allow less silicone (preferably polysiloxane) to effectively coat a given surface area. This composition comprises: (1) an hydroxy-functional resin which is compatible with the other components of the composition, preferably an hydroxy-functional polyester resin; (2) a cross-linking agent for the hydroxy resin, preferably an aminoplast resin, like hexamethoxymethyl melamine; and (3) at least one and preferably a mixture of at least two reactive silicones. These reactive silicones comprise a hydrogen- or alkoxy-functional silicone in which the alkoxy group contains from 1-10 carbon atoms. When the preferred mixture of two reactive silicones is employed, the hydrogen- or alkoxy-functional silicone referred to can be identified as component (A) and the second silicone is; (B) an elastomeric silicone reactive with the hydrogen- or alkoxy-functional silicone to provide release properties. One or more of the silicones must be reactive with the hydroxy resin and/or the cross-linking agent, and components (1), (2) and (3) are compatible in liquid admixture so that they can be coated upon a substrate in intimate admixture. The preferred silicones are polysiloxanes.

The silicones in component (3) become incompatible with respect to the balance of the composition as reaction proceeds to cause stratification of the silicone release material to the surface of the cured coating when the composition is deposited upon a substrate and heated to cure the same. This stratification allows the hydroxy resin and its cross-linking agent to concentrate at a paper surface where it can fill any voids in the paper, and it allows the silicone release material to concentrate at the exposed surface of the coating to provide a nonadherent surface using less silicone to effectively cover a given surface area.

It is also permissible to additionally include other reactive silane or siloxane materials, such as vinyl- or hydroxy-functional siloxanes, to modify the release properties as needed for particular utilities, as is known to the art.

This invention is especially applicable to coating paper, but it is also applicable to plastic surfaces, like terephthalic polyesters (Mylar) and polypropylene, with a release coating, and the conventional release coatings do not adhere well to these surfaces. Some of the release coatings of this invention adhere well to these surfaces, so pretreatment of the substrate surface is not needed.

Since this invention can be applied to systems which contain 100% solids as well as those which contain a liquid thinner enabling application, such as an inert volatile organic solvent, the term "compatible" here describes the absence of separation of the components in the liquid coating composition from one another until after application of the coating to the substrate. Separation is intended after application, and this usually accompanies the curing reaction in which the silicones react with themselves or one another to increase the molecular weight and complexity of the silicone component to force the silicones to separate from the hydroxy-functional resin. This separation or stratification is easily detected in the cured coating by the high concentration of silicone at the exposed surface of the coating.

From the standpoint of the coated product, the hydroxy-functional resin and its curing agent are concentrated at the substrate surface (in and around the porosities of the paper usually used) and the reacted silicones are concentrated at the exposed surface. Between these concentrations is a gradient in which all of the components (1), (2) and (3) are present and reacted with one another.

Component (3) cannot be deposited upon a previously deposited layer of components (1) and (2), for the use of two treatments is uneconomical and, if tried, it would be hard to meter the small amount of the silicone coating. Also, when platinum catalysts are used, there would not be sufficient chemical combination between the polysiloxanes and components (1) and (2) to provide good intercoat adhesion, unless some special treatment is employed. As a result, when the release coated paper is subsequently coated with adhesive and adhered to label stock (or adhered to adhesive-coated label stock), removal of the label stock with its adhesive surface would remove some of the silicone layer. Wherever the silicone is removed, it covers the adhesive surface of the label, preventing it from there sticking to a substrate against which it is applied.

This invention seeks to provide a combination in which little, preferably 0%, of the adhesive surface is covered with polysiloxane when the adhesively coated label is removed.

One must also provide a release coating which is fully effective over the entire surface of the supporting paper stock. If some portion of the paper is not provided with good release properties, then some of the adhesive which should remain with the label will instead stay with the supporting paper when the adhesively coated label is removed. Again, the adhesively coated label will be incompletely adhered to the substrate to which it is applied, assuming the label can be removed in the first place.

In the previous efforts to provide release coated paper of the character under consideration, it was necessary to employ from 0.5 to 1.0 pounds of silicone per ream of paper. The smaller proportions within the range are useful when very smooth paper stock, such as supercalandered paper, is employed. It is found that one can usually obtain equivalent release properties using about one-fourth of the amount of the silicone material previously employed.

Also, and since much smaller proportions of expensive polysiloxanes are useful herein, one can employ less costly and more porous paper stock to support the silicone release coating. This is because stratification causes the hydroxy resin and cross-linking agent therefor to concentrate at the paper surface to fill the porosities in the paper.

This invention is preferably carried out using two different types of compositions. The choice between these compositions depends upon whether the coater who applies the composition will tolerate the presence of volatile organic solvent.

The hydroxy-functional resin, sometimes termed the hydroxy resin, may be any resin having sufficient hydroxy functionality for cure and which is compatible with the other components of the coating composition until after application. Polyester resins are preferred, and these will be discussed hereinafter. Other hydroxy functional resins which may be used are illustrated by copolymer of monoethylenically unsaturated monomers, such as a solution copolymer of 15% 2-hydroxyethyl acrylate, 40% lauryl methacrylate and 45% styrene, methyl methacrylate or a mixture thereof. Copolymers of vinyl acetate hydrolyzed to 50% hydroxy content, with half of these hydroxy groups being esterified with stearic acid, may also be used.

Referring more particularly to a preferred composition which can be applied at 100% solids content so that volatile organic solvents are not needed, this composition comprises: (1) a low molecular weight sufficiently fluid for coating application) polyester resin of high hydroxy-functionality (hydroxy number of at least about 100) preferably modified with an unsaturated oil, such as a safflower oil-modified alkyd resin; (2) a cross-linking agent for the polyester, as previously described; and (3) a mixture of two reactive polysiloxanes comprising: (A) a hydrogen- or alkoxy-functional polysiloxane; and (B) an elastomeric vinyl- or hydroxy-terminated polysiloxane which reacts with the hydrogen- or alkoxy-functional silicone to provide release properties.

Using the hydrogen-functional polysiloxane as illustrative, the hydrogen groups of the hydrogen-functional polysiloxane are reactive with the vinyl groups in the vinyl-terminated polysiloxane and also with the unsaturation in the unsaturated oil. This reaction is catalyzed with a platinum catalyst, such as chloro platinic acid. The hydrogen groups of the hydrogen-functional polysiloxane are also reactive with the hydroxy functionality in the hydroxy resin. The hydroxy groups of the hydroxy resin are reactive with the preferred aminoplast cross-linking agent, and an acid catalyst, such as dodecyl benzene sulfonic acid, is used to encourage this reaction. These several reactions thermoset the stratified release layer at the exposed coating surface and provide the adhesion between the stratified layers which is desired. To further improve the adhesion between the layers, silane coupling agents can be added to the mixture of components (1), (2) and (3), these coupling agents being usually trimethoxy silanes containing an amine, mercaptan or epoxy functional group as the fourth substituent on the silane silicon atom, as is known.

The hydrogen groups of the hydrogen-functional polysiloxane are also reactive with hydroxy groups in a hydroxy-terminated polysiloxane, and this reaction is catalyzed with a metal salt where the metal ion is selected from the lead to manganese electromotive force series. This series of metal catalysts is well known and is illustrated by a tin salt of a monocarboxylic or dicarboxylic acid, such as dibutyl tin diacetate.

One can employ hydroxy-functional polyester resins and polysiloxanes of relatively low molecular weight. These materials are liquids which flow easily to enable coating application in the absence of volatile solvent. Some coaters insist that such solvent be entirely absent, and a typical composition which can be used in the absence of solvent will be illustrated hereinafter. Of course, some coaters will tolerate a small amount of organic solvent, and in such instances a small amount of solvent can be used to adjust viscosity. Thus, these compositions are preferably used in the substantial absence of volatile organic solvent.

Components (1), (2) and (3) in the above composition are compatible in liquid admixture, and the polysiloxanes in component (3) become incompatible with respect to the balance of the composition as the curing reactions proceed to cause stratification of the polysiloxane release material to the surface of the cured coating when the composition is deposited upon a paper or other substrate and heated to cure the same.

Some coaters will tolerate the presence of significant proportions of organic solvent, and this enables the utilization of polysiloxanes of higher molecular weight which are not sufficiently fluid to provide a composition which can be applied in the absence of solvent. In such instance, this invention can be practiced with an alternative type of composition comprising: (1) a more viscous hydroxy resin which is preferably a more highly branched hydroxy-functional polyester resin than in the solvent-free composition, as by the presence therein of a component having a functionality of at least 3, like pentaerythritol; (2) a cross-linking agent for the polyester, as previously described; and (3) a mixture of at least two reactive polysiloxanes. These two reactive polysiloxanes comprise: (A) a hydrogen- or alkoxy-functional polysiloxane; and (B) a high molecular weight elastomeric hydroxy- or vinyl-terminated polysiloxane reactive with the hydrogen-functional siloxane to provide release properties.

To illustrate the action when a hydroxy-terminated polysiloxane is employed, it is reactive with aminoplast resin cross-linking agents. The acid catalyst relied upon to encourage the cure between the polyester resin and the aminoplast resin also encourages reaction between the hydroxy-functional polysiloxane and the aminoplast resin. This helps to provide adhesion between the stratified layers of the cured coating. The hydrogen groups of the hydrogen-functional polysiloxane are also reactive with the hydroxy groups present in both the polyester resin and the hydroxy-functional polysiloxane. These reactions are catalyzed with the previously described metal salt catalysts, such as dibutyl tin dilaurate. These reactions serve to aid adhesion between the stratified layers and to thermoset the release layer at the exposed surface.

To illustrate the action when a vinyl-terminated polysiloxane is employed, the hydrogen groups of the hydrogen-functional polysiloxane are reactive with the vinyl groups of the vinyl-functional siloxane and the hydroxy groups present in the polyester resin. These reactions are catalyzed with platinum and acid catalysts and serve to thermoset the release layer at the exposed surface and to aid adhesion between the stratified layers.

This type of composition can tolerate polyester resins and hydroxy- or vinyl-functional polysiloxanes whch are highly viscous or even solid at room temperature (25° C.) and sufficient non-reactive volatile organic solvent can be added to provide the fluidity needed for coating application.

Components (1), (2) and (3) in the above composition are compatible in the solvent solution coating composition, and the polysiloxanes in component (3) become incompatible with respect to the balance of the composition as the solvent is vaporized away and the curing reaction proceeds, as previously described.

As will be evident, heat is employed to speed the removal of solvent, if it is present, and this heat is relied upon to force the various curing reactions which have been specified to proceed to cure the composition in a reasonable period of time.

Water application is also permissible. Carboxyl-functional polyesters or copolymers having an acid value of from 30 to 150 can be dispersed in water with the aid of a volatile base, such as ammonia, and the silicone materials can be added as aqueous emulsions, as illustrated in U.S. Pat. Nos. 2,588,367 and 3,900,617. While one may include acid-functional polyesters or copolymers, as noted above, it is also possible to use polyesters or copolymers having very little acid content and an hydroxyl value of from about 50 to about 250, preferably from 100 to 200. These can be dispersed in water together with the melamine resin curing agent using simple agitation and without the addition of any base. Thus, the hexamethoxymethyl melamine can be dissolved in the water after the addition of the polyester or copolymer, or together therewith. In this way, water can be used to replace all or most of the volatile organic solvent.

The polyesters which are used herein are hydroxy-functional polyesterification products of polycarboxylic acids with polyalcohols, the polyalcohol being used in stoichiometric excess over the carboxyl functionality present to provide hydroxy groups for subsequent cure. An hydroxy number of from about 40 to about 250, preferably from 100 to 200, is appropriate. Typical polycarboxylic acids are phthalic acid, adipic acid, and their anhydrides. Typical polyalcohols are glycerine or butane diol. The production of polyesters and their components are common knowledge in polymer chemistry.

When the polyester is to be used in solvent-free compositions, it should be a low molecular weight polyester which is a free flowing liquid at room temperature to be useable in the absence of more than 5% of volatile organic solvent, based on total resin solids present. These polyesters may be modified with an unsaturated oil or fatty acid derived therefrom, so as to contain ethylenic unsaturation providing an iodine number of at least 30, preferably at least 80, for cure. The usual oil modified alkyd resins are formed by reacting an unsaturated oil of fatty acid therefrom, such as safflower oil, linseed oil, dehydrated castor oil, soya oil or a fatty acid derived therefrom, with glycerin and phthalic anhydride. A small amount of maleic anhydride is usually included to assist polyester formation.

The cross-linking agent for the hydroxy resin may be anything having a plurality of groups reactive with the hydroxy groups of that resin. The preferred cross-linking agent is an aminoplast resin, like hexamethoxymethyl melamine, and the aminoplast cure of hydroxy-functional resins is conventional and is commonly speeded with an acid catalyst. These catalysts are well known. Para toluene sulfonic acid is a common useful catalyst, and this known class of catalysts is also illustrated in the Examples. Hexamethoxymethyl melamine is preferred because it is liquid at room temperature and helps to minimize the proportion of solvent.

Other cross-linking agents for hydroxy-functional resins are also well known, and are best illustrated by phenoplast resins, such as the conventional solvent-soluble phenol-formaldehyde condensates. Tertiary butyl phenol or cresol may be used in place of the phenol in these condensates. Organic polyisocyanates whch are blocked to prevent prereaction are also useful, and these are illustrated by the diurethane reaction product formed by reacting two moles of 2-ethyl hexanol with one mole of 2,4-toluene diisocyanate or isophorone diisocyanate. Aminoplast cross-linking agents, phenoplast cross-linking agents and blocked polyisocyanate cross-linking agents are all known for the cure of hydroxy-functional resins.

The reactive silicones (polysiloxanes) which cure to provide a release coating are themselves known. With reference to the use of mixtures, which is preferred, any curable mixture of a hydrogen- or alkoxy-functional polysiloxane and an elastomeric polysiloxane carrying groups reactive with the Si—H or Si—OR groups of the polysiloxane may be used. R denotes an alkyl or alkoxyalkyl group containing from 1 to 10 carbon atoms. When the substantial absence of organic solvent is desired, the reactive polysiloxanes will comprise: (A) a hydrogen- or alkoxy-functional polysiloxane; and (B) an elastomeric polysiloxane reactive with the hydrogen- or alkoxy-functional polysiloxane to provide release properties. As previously indicated, other silicone or silane materials may be added, but this is not essential.

The Si—H or Si—OR groups are reactive in various ways. The Si—H groups of the hydrogen-functional polysiloxane are reactive with the unsaturation and hydroxy functionality in the oil-modified polyester resin, and with the polysiloxane if it carries unsaturated groups (vinyl groups) or hydroxy groups. This reaction between Si—H and ethylenic unsaturation is known and is normally catalyzed by a platinum-type catalyst. The reaction with hydroxy groups is also known and is normally catalyzed by a metal salt catalyst, as previously illustrated. The alkoxy functionality which may be selected is reactive with hydroxy functionality in the polyester resin and in the polysiloxane, and the tin-type catalyst assists these reactions.

The hydrogen-functional polysiloxane, the alkoxy-functional polysiloxane, the hydroxy-functional polysiloxane, and the vinyl-functional polysiloxane are all available in commerce as easily flowable liquid resins. This enables these to be used in a liquid mixture which is easily applied as a coating on a paper substrate in the substantial absence of organic solvent.

All of the above components are compatible in liquid admixture, and solvent is not needed to provide compatibility. When the liquid coating composition is applied as a coating and heated to cause the components of the coating to react, the polysiloxanes grow in molecular weight and complexity and become incompatible with respect to the balance of the composition. This causes stratification of the polysiloxane release material to the surface of the cured coating, and this allows the hydroxy resin and its cross-linking agent to concentrate at the paper surface where it can fill the voids of the paper to reduce the amount of needed polysiloxane.

Significant proportions of volatile organic solvent enable the use of resins which are not sufficiently fluid for application in the absence of solvent. The capacity to use a higher molecular weight less fluid hydroxy resin, e.g., the polyester resin which is preferred, allows one to employ hydroxy-functional resins which may be of higher molecular weight or more highly branched. This is preferably accomplished by including in the materials subject to polyesterification a component having a functionality of at least 3, such as a trihydric acid, like trimellitic anhydride, or a polyol of higher functionality, like trimethylol propane or pentaerythritol. Suitable branched hydroxy-functional polyester resins will be illustrated in the examples. Since these are more viscous than those used in the absence of solvent, a somewhat lower hydroxy number of about 40 may be used, and this is about the least hydroxy functionality which can be used in the hydroxy resin.

The cross-linking agent for the more viscous polyester resins is the same as is used for the less viscous oil-modified polyesters. However, unsaturation is no longer needed, so the polyester need not be oil-modified, or if oil-modified, the fatty acid or oil may be saturated.

The two reactive polysiloxanes may now be of somewhat different character because the presence of organic solvent now allows the use of higher molecular weight polysiloxanes to provide the elastomeric release layer. The hydrogen-functional polysiloxane is much the same as was used previously, but the elastomeric polysiloxane need no longer be a relatively low molecular weight material, and one can instead employ relatively high molecular weight polysiloxanes in which the reactive groups are preferably hydroxyl groups or vinyl groups which are usually supplied by having one such group at each end of the molecule, but larger numbers of reactive groups are also useful.

The hydrogen groups of the hydrogen-functional siloxane are reactive with the hydroxy groups which are present in the hydroxy resin and in the hydroxy-functional polysiloxane, and also with the vinyl groups which are present in the vinyl-functional polysiloxane, and these reactions are catalyzed with acid and tin-type or platinum catalyst, as previously noted.

Sufficient non-reactive volatile organic solvent is added to provide the fluidity or compatibility needed for coating application, and useful solvents are common knowledge. Any solvent, such as methyl ethyl ketone, 2-ethoxy ethanol acetate, heptane, chlorinated hydrocarbons, like trichlorethylene, butyl acetate, toluene or xylene, may be used. Hydrocarbon solvents are preferred for the higher molecular weight polysiloxanes. Suitable solvents are further illustrated in the Examples.

Referring more particularly to the elastomeric vinyl-terminated polysiloxane having release properties, these can be described as organosilicone polymers having an average of from one to three groups per silicon atom selected from the group consisting of monovalent hydrocarbon radicals, free of acetylenic unsaturation, monovalent halohydrocarbon radicals, free of aliphatic unsaturation, and cyanoalkyl radicals, there being at least one terminally unsaturated monovalent olefin radical per molecule, the remaining valences of the silicon atoms of the said organosilicon polymer being satisfied by selection from the group consisting of divalent oxygen atoms, divalent hydrocarbon radicals, free of acetylenic unsaturation, divalent hydrocarbon ether radicals, free of acetylenic unsaturation, and divalent haloarylene radicals, said divalent radicals linking silicon atoms.

The optional polysiloxanes which may be present are illustrated by polysiloxane terpolymers which can be described as an organosilicon resin consisting of $R_3SiO1/2$, $R_2SiO$ and $SiO4/2$ units in which the R groups may be the same or different and selected from hydrogen, hydroxy, alkyl, aryl, aralkyl, alkaryl, alkenyl, cycloalkyl, cycloalkenyl groups. It is preferred to have all or most of the R groups constituted by methyl groups, as is well known, but phenyl groups are also available.

Referring more particularly to the hydroxy-functional polysiloxanes which may be used herein, these can be described as an organosilicon compound containing at least one silicon-bonded hydroxy group per molecule, there being in addition an average of up to two groups per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by groups selected from the group consisting of divalent oxygen atoms, divalent hydrocarbon radicals, free of aliphatic unsaturation, divalent hydrocarbon ether radicals free of aliphatic unsaturation, and divalent haloarylene radicals, said divalent radicals linking silicon atoms.

The sum of the average number of terminally unsaturated monovalent olefin radicals per molecule of the vinyl-terminated silicone or the average number of hydroxy groups per molecule of the hydroxy-terminated silicone, and the average number of silicon-bonded hydrogen atoms per molecule of the hydrogen-functional silicone or the alkoxy-functional silicone, is greater than 3.

It is preferred for these silicones to be organopolysiloxanes, usually methyl-substituted. The hydrogen-functional silicone is most preferably a methyl-substituted organopolysiloxane having an average of 3 to 75 silicon-bonded hydrogen atoms per molecule.

The preferred hydrogen-functional silicones are organopolysiloxanes having an average of 3 to 75 silicon-bonded hydrogen atoms per molecule and having a viscosity of from about 2 to about 100 centipoises and a molecular weight of about 330 to about 5000. A product having a viscosity of 30 centipoises and a molecular weight of 2270 is particularly useful.

The alkoxy-functional silicones may be monomers or disiloxane compounds of polymeric compounds, such as silicates, polysilicates, or polyalkoxy polysiloxanes resulting from the partial hydrolysis of monomers of the formula $Si(OR)_4$ and/or $R'Si(OR'')_3$, where R, R' and R'' are alkyl or alkoxyalkyl containing from 1 to 10 carbon atoms, preferably from 1 to 4 carbon atoms.

It is preferred to use polyalkoxy polysiloxanes containing from 3 to 75 alkoxy groups per molecule.

The preferred vinyl-terminated silicone is also the same as the hydrogen-functional polysiloxanes, except that in place of the Si—H groups, we have a smaller number of ethylenically unsaturated groups, e.g., vinyl groups. These vinyl-terminated silicones are most preferably an organopolysiloxane having an average of from 1.98 to 2.05 groups per silicon atom which are selected from the group consisting of vinyl, methyl, phenyl and 3,3,3-trifluoropropyl and having an average of from 2 to 5 vinyl groups per molecule.

The preferred hydroxy-functional polysiloxanes are again the same as the hydrogen-functional polysiloxanes, except that the Si—H groups are replaced by a smaller number of hydroxy groups which may be carried directly by the silicon atoms or which may be carried by hydrocarbon groups which terminate in the alcoholic hydroxyl group.

The vinyl-terminated polysiloxane and the hydrogen-functional polysiloxanes are catalyzed by a platinum catalyst in an amount of at least 0.5 part per million of platinum based on the combined weights of the two silicone materials. The optional polysiloxane, if present, would be catalyzed in accordance with its reactivity, as has been described.

Any platinum catalyst can be used, for example platinum deposited on charcoal or alumina, chloroplatinic acid, or the reaction product of chloroplatinic acid and olefins or organosilicon compounds containing olefin radicals. In place of the platinum catalyst, one can use rhodium catalysts, as pointed out in U.S. Pat. No. 3,928,629 which discloses sulphur-containing rhodium complexes and rhodium-carbonyl complexes. An illustrative rhodium catalyst has the formula: $RhCl_2(Bu_2S)_3$. Also, the platinum catalyst can be replaced by ruthenium, rhodium, palladium, osmium, and iridium, or a complex containing these metals.

Silicone compositions of the type described above are known and are disclosed in U.S. Pat. Nos. 2,823,218 and 3,249,581. Also, and to render the compositions more stable on admixture, one may also include an organic compound having a boiling point of at least 25° C. and at least one —C≡C— group, said organic compound being free of nitrogen, carboxyl, phosphorus, mercapto groups, and carbonyl groups which are alpha to aliphatically unsaturated carbon atoms, there being at least 2 times the moles of —C≡C— present as the moles of platinum present. The compositions containing the two silicone materials, the platinum catalyst, and including the acetylenic group-containing organic compound which are preferably secondary or tertiary alcohols, like 2-ethynyl-isopropanol, 3,5-dimethyl-1-hexyne-3-ol, isopropenylacetylene, and 2-ethynyl-butane-2-ol are more fully described in U.S. Pat. No. 3,445,420, the disclosure of which is incorporated herein by reference.

In place of the acetylenic organic compound one can use diallyl maleate to render the catalyst less prone to rapidly gel the composition prior to use. This is shown in U.S. Pat. No. 4,256,870.

Referring more particularly to the high molecular weight elastomeric hydroxy- or vinyl-functional polysiloxane having release properties, these are hydroxy- or vinyl-terminated silicones, preferably polysiloxanes, which have sufficient molecular weight to be viscous liquids. It is the excessive viscosity of these liquids for normal coating application which requires that a proportion of organic solvent be used to reduce the viscosity and enable application. These polysiloxanes are preferably dihydric or divinylic, since these are most readily available in commerce. Typical polysiloxanes which are available at 100% solids have a room temperature viscosity in excess of about 3,000 centipoises and are dimethyl polysiloxanes, except for the two terminal silicon atoms which also carry a single hydroxy group. These hydroxy terminated silicones are sometimes sold in combination with hydrogen-functional polysiloxanes.

The invention will be illustrated in the following Examples, it being understood that throughout this application, all parts and proportions are by weight unless otherwise stated.

EXAMPLE 1

The components listed below were mixed together to provide an off-white, milky liquid having a pot life of about 4–6 hours. Two formulas were prepared, as indicated the Table.

TABLE

| Component | I | II |
|---|---|---|
| 1-alkyd-melamine blend | 100 | 100 |
| 2-vinyl-terminated polysiloxane (see note 1) | 13.9 | 23.1 |
| 3-hydrogen-functional polysiloxane (see note 2) | 1.8 | 3.0 |
| 4-dodecyl benzene sulfonic acid | 5.2 | 5.8 |

The two compositions set forth above were both fully effective, except composition II which contained a larger proportion of polysiloxane release material produced a somewhat stronger release action.

These liquids are used by applying them as a coating upon paper in a typical weight of about 1.5 pound per ream (3000 square feet). The applied coating is then cured by passing it through an oven maintained at 140° C. for 30 seconds. At this cure schedule the cure is rapid and one can shortly thereafter overcoat the cured coating with adhesive. If a lesser curing schedule is used, such as 120° C. for 30 seconds, then it is desirable to allow the coating to age for at least 24 hours to insure that the siloxanes have reasonably completely reacted with one another to make sure that the applied adhesive is completely released by the release coating when a label which is subsequently adhered to the adhesive is removed for use.

Note 1: A vinyl-terminated polydimethylsiloxane having a room temperature viscosity of 300 centipoises which may be the Dow Corning product SYL OFF 7600, formerly sold as Q2-7203.

Note 2: A hydrogen-functional polymethylsiloxane polymer having a room temperature viscosity of 35 centipoises which may be the Dow Corning product SYL OFF 7601, formerly sold as Q2-7220.

The alkyd resin used in the above composition is made by heating a mixture of 650 grams of safflower oil and 137 grams of glycerine to 232° C. in the presence of 0.3 gram of reagent grade sodium hydroxide to catalyze an alcoholysis reaction. Alcoholysis is considered complete if a clear solution results when 1 part of alcoholysis product is mixed with either 4 parts of methanol or 1 part of melted phthalic anhydride. About ½ to 1 hour is required to carry out the alcoholysis reaction.

After the reaction mixture is cooled to 140° C., 57 grams of phthalic anhydride and 100 grams of adipic acid are added, and 19 grams of xylene are added to allow water of reaction to be removed by azeotropic distillation. The mixture is then heated slowly to 220° C. and held at this temperature until the polyesterification reaction is complete, as indicated by an acid value of less than 5. The contents of the receiver used to trap water are then removed and most of the remaining xylene are removed by passing dry nitrogen gas through the hot material for ½ hour. The batch was cooled and processed neat to provide an alkyd resin of relatively low molecular weight (Gardner-Holdt viscosity of R), the number average molecular weight is about 805.6. The solids content was 98.31%, so there is little solvent present, and the acid value was 2.8. The hydroxyl value (theoretical) is 136.5.

To provide the alkyd-melamine blend which is used in this Example, 100 parts of the above alkyd resin are mixed with 55 parts of hexamethoxymethyl melamine (American Cyanamid product Cymel 301 may be used) at room temperature.

EXAMPLE 2

125 grams of glycerin, and 1085 grams of stearic acid, are heated to 100° C. and then 66 grams of benzoic acid and 400 grams of pentaerythritol are added. The mixture is heated to 230° C. in the presence of 50 grams of xylene to enable azeotropic removal of water. After the theoretical water (78 ml.) is collected in about ½ hour, the batch is cooled to 160° C. and 50 grams of glycerin, 82 grams of pentaerythritol, 12 grams of maleic anhydride and 738 grams of phthalic anhydride are added. The mixture is heated to 220° C. while collecting water and held at that temperature until the acid value is below 10. After cooling to 100° C., toluene was added to a solids content of 60%. The product has a Gardner-Holdt viscosity of Z1, an acid number of 7.88, an hydroxy number of 134.5, and a number average molecular weight of 3140.

100 pounds of the above polyester resin solution at a temperature of 85°-110° F. has added thereto 36 pounds of hexamethoxymethyl melamine (American Cyanamid product Cymel 303 may be used), 57.9 pounds of toluene and 18.4 pounds of aliphatic hydrocarbon solvent having a boiling range of 350°-386° F. (Exxon product Isopar K may be used). There is then separately premixed 3.88 pounds of dodecyl benzene sulfonic acid catalyst (American Cyanamid product Cycat 600 may be used) with 0.86 pounds of 2-amino-2-methyl-1-propanol. When the exotherm subsides, this catalyst solution is added to the previously described mixture, which is then strained into drums for storage.

To 100 pounds of solution stir in 54.3 pounds of the previously specified aliphatic hydrocarbon solvent and then sequentially add 7.1 pounds of a preformed mixture containing 30% solids in xylene, the solids being 94% dihydroxy-terminated polydimethylsiloxane providing the 30% solution with a room temperature viscosity of 30,000 centipoises, and 4% of a hydrogen-functional polymethyl hydrogen polysiloxane having a room temperature viscosity of about 30 centipoises similar to the hydrogen-functional polymethylsiloxane polymer used in Example 1. There is then added 0.74 pounds of a dihydroxy polydimethylsiloxane (100% solids) having a viscosity of 12,500 and 0.53 parts of dibutyl tin diacetate (Dow Corning catalyst 176 may be used). This mixture has a pot life greater than 8 hours. When coated upon paper at about 1.0 pound per ream and cured at 150° C. for 30 seconds, it provides a coated paper having good release properties.

The release properties and the intercoat adhesion of this coating can be enhanced by adding to the composition 0.74 pounds of an epoxy-functional silane, such as Dow Corning product SYL OFF 297.

The compositions of these examples are also adherent to Mylar and polypropylene.

EXAMPLE 3

Example 2 is repeated using in place of the 7.1 pounds of 30% solids xylene solution, a solution in which the solids are supplied by a mixture of:

45% alpha, omega, di(hydroxyl)-methylvinyl polysiloxane oil containing 95% $(CH_3)_2SiO$ units, 5% $CH_2(CH_2=CH)SiO$ units and having a viscosity of 500 mPa.s at 25° C.;

45% methylpolysiloxane oil having a viscosity of 75 mPa.s at 25° C. and containing 25% $CH_3SiO_{1.5}$ units, 72.5% $(CH_3)_2SiO$ units and 2.5% of $(CH_3)_3SiO_{0.5}$ units and having 1.8% by weight of hydroxyl groups; and 10% of silane having the formula $CH_2=CHSi(OCH_2CH_2OCH_3)_3$.

Corresponding results are obtained.

EXAMPLE 4

The components specified below are mixed together to provide an off-white, milky liquid having a pot life of about 6-8 hours.

| | |
|---|---|
| alkyd-melamine blend (same as Example 1) | 100 parts |
| hydrogen-functional polysiloxane (Note 3) | 20 parts |
| dodecylbenzene sulfonic acid | 1.3 parts |
| dibutyl tin diacetate | 0.5 parts |

This liquid is used by applying it as a coating upon paper in a typical weight of about 1.5 pounds per ream. The applied coating is then cured by passing it through an oven maintained at 150° C. for 60 seconds.

Note 3: A hydrogen-functional polymethylsiloxane polymer having a room temperature viscosity of 30 centipoises which may be the Dow Corning product 1107 fluid.

EXAMPLE 5

The components listed below are mixed together to provide an off-white, milky liquid.

| | |
|---|---|
| alkyd melamine blend | 55 parts alkyd; |
| (Alkyd of Example 1) | 25 parts Cymel 350 |
| aqueous silicone emulsion (Note 4) | 40 parts |
| dodecylbenzene sulfonic acid | 5.7 parts |
| dibutyl tin diacetate | 4.0 parts |

The mixture has a pot life of about 4 hours. When coated upon paper at about 1.0 pounds per ream and cured at 150° C. for 60 seconds, it provides coated paper with good release properties.

Note 4: The aqueous silicone emulsion is a 50% solids emulsion in water, the solids being 95% dihydroxy-terminated polydimethylsiloxane having a viscosity of 300,000 centipoises and 5% of a hydrogen functional polymethyl siloxane polymer having about 35 Si—H groups, and a viscosity of 30 centipoises. (The Dow Corning product 1171A may be used).

What is claimed is:
1. Paper coated with a release coating comprising:
 (1) an hydroxy-functional resin;
 (2) a cross-linking agent for the hydroxy-functional resin; and
 (3) a mixture of at least two reactive silicones comprising:
  (A) a hydrogen- or alkoxy-functional silicone in which the alkoxy group contains from 1-10 carbon atoms; and
  (B) an elastomeric silicone reactive with said hydrogen- or alkoxy-functional silicone to provide release properties,
said hydroxy resin being reacted with said cross-linking agent and concentrated at the paper surface where it fills the voids therein, said reacted silicones being concentrated at the exposed surface of the coating where the release properties are needed, and a gradient of said materials between the opposite concentrations at said paper surface and said exposed surface in which all of said components (1), (2) and (3) are present and reacted with one another.

2. Coated paper as recited in claim 1 in which said hydrogen- or alkoxy-functional silicone is a methyl-substituted polysiloxane having an average of 3 to 75 silicon-bonded hydrogen atoms or alkoxy groups per molecule.

3. Coated paper as recited in claim 2 in which said elastomeric silicone is a vinyl- or hydroxy-terminated silicone which is a polysiloxane having an average of from 1.98 to 2.05 groups per silicon atom which are selected from the group consisting of vinyl, methyl, phenyl, and 3,3,3-trifluoropropyl, and having an average of from 2 to 5 vinyl groups per molecule.

4. Coated paper as recited in claim 1 in which said elastomeric silicone is a dihydric polydimethylsiloxane having a room temperature viscosity in excess of about 3,000 centipoises.

5. A plastic substrate coated with a release coating comprising:
  (1) an hydroxy-functional resin;
  (2) a cross-linking agent for the hydroxy-functional resin; and
  (3) a mixture of at least two reactive silicones comprising:
    (A) a hydrogen- or alkoxy-functional silicone in which the alkoxy group contains from 1–10 carbon atoms; and
    (B) an elastomeric silicone reactive with said hydrogen- or alkoxy-functional silicone to provide release properties,
said hydroxy resin being reacted with said cross-linking agent and concentrated at the substrate surface where it adheres thereto, said reacted silicones being concentrated at the exposed surface of the coating where the release properties are needed, and a gradient of said materials between the opposite concentrations at said substrate surface and said exposed surface in which all of said components (1), (2) and (3) are present and reacted with one another.

6. A coated plastic substrate as recited in claim 5 in which said substrate is selected from polyethylene terephthalate and polypropylene.

* * * * *

UNITED STATES PATENT AND TRADEMARK OFFICE
CERTIFICATE OF CORRECTION

PATENT NO. : 4,654,270
DATED : March 31, 1987
INVENTOR(S) : John Katchko et al.

It is certified that error appears in the above-identified patent and that said Letters Patent is hereby corrected as shown below:

On the face of the patent, following the listing of the inventors, insert:

-- Assignee: DeSoto, Inc., Des Plaines, Ill. --

On the face of the patent, after "Primary Examiner--Edith Buffalow", insert:

-- Attorney, Agent, or Firm--Dressler, Goldsmith, Shore, Sutker & Milnamow, Ltd. --

Signed and Sealed this

Twenty-fifth Day of August, 1987

Attest:

DONALD J. QUIGG

Attesting Officer

Commissioner of Patents and Trademarks